United States Patent
Park

(10) Patent No.: US 7,230,904 B2
(45) Date of Patent: Jun. 12, 2007

(54) COMPATIBLE OPTICAL DISK PLAYER AND DATA RECORDING AND REPRODUCING METHOD

(75) Inventor: Soo-han Park, Kyungki-do (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 1046 days.

(21) Appl. No.: 09/852,002

(22) Filed: May 10, 2001

(65) Prior Publication Data
US 2001/0043522 A1    Nov. 22, 2001

(30) Foreign Application Priority Data
May 18, 2000   (KR) ................... 2000-26782

(51) Int. Cl.
*G11B 7/00*   (2006.01)
(52) U.S. Cl. ............... 369/112.04; 369/44.37
(58) Field of Classification Search ........... 369/112.06, 369/44.14, 44.37, 94, 44.23, 112.04, 112.09, 369/112.28, 112.05, 112.17, 121, 103, 112.1, 369/112.15, 44.12, 112.03, 112.23, 44.17, 369/44.41, 120, 112.19, 112.12, 112.08, 112.21, 369/112.24, 109, 53.2, 112, 112.07, 44.42; 372/9, 36.01, 101
See application file for complete search history.

(56) References Cited
U.S. PATENT DOCUMENTS

| | | | |
|---|---|---|---|
| 4,546,463 A | | 10/1985 | Opheij et al. |
| 5,153,863 A | * | 10/1992 | Noda et al. ............... 369/44.11 |
| 5,717,674 A | * | 2/1998 | Mori et al. ............... 369/112.1 |
| 6,084,843 A | * | 7/2000 | Abe et al. ............... 369/112.07 |
| 6,125,091 A | * | 9/2000 | Kasuga ................... 369/112.05 |
| 6,130,872 A | * | 10/2000 | Sugiura et al. ......... 369/112.04 |
| 6,147,956 A | * | 11/2000 | Jutte et al. ............. 369/112.23 |

(Continued)

FOREIGN PATENT DOCUMENTS

CN    1156308    8/1997

(Continued)

OTHER PUBLICATIONS

Notification of Rejection Reasons with respect to Taiwanese Patent Application No. 90110602 filed on May 3, 2001.

(Continued)

*Primary Examiner*—Andrea Wellington
*Assistant Examiner*—Kim-Kwok Chu
(74) *Attorney, Agent, or Firm*—Staas & Halsey LLP

(57) ABSTRACT

A simulation device for simulating an operation of a system constituted by a plurality of machines. An operation program is executed by an arithmetic processing unit in a controller of a machine or by an information processing device having a function of analyzing the operation program equivalent to the controller of the machine, to obtain operation command data for the machine. The obtained operation command data of the machine with lapsing time information are received by the simulation device and stored as historical data. Operation programs of all of the machines constituting the system are executed to obtain historical data of operations of the machines, which are united by arranging the data in time series from a start of simultaneous operations of the machines based on the lapsing time information. Images of three-dimensional models of the machines are displayed by animation based on the united historical data.

32 Claims, 3 Drawing Sheets

U.S. PATENT DOCUMENTS

| | | | | |
|---|---|---|---|---|
| 6,154,433 A | * | 11/2000 | Hoshino et al. | 369/112.04 |
| 6,181,667 B1 | * | 1/2001 | Mori et al. | 369/112.03 |
| 6,185,176 B1 | * | 2/2001 | Sugiura et al. | 369/112.1 |
| 6,195,315 B1 | * | 2/2001 | Takahashi et al. | 369/44.23 |
| 6,366,548 B1 | * | 4/2002 | Ohyama | 369/112.04 |
| 6,404,709 B1 | * | 6/2002 | Kouno | 369/44.23 |
| 6,552,990 B1 | * | 4/2003 | Kajiyama et al. | 369/112.06 |

FOREIGN PATENT DOCUMENTS

| | | |
|---|---|---|
| CN | 1223740 | 7/1999 |
| EP | 0692786 | 1/1996 |
| EP | 0 777 221 A1 | 6/1997 |
| EP | 0 932 145 A1 | 7/1997 |
| EP | 0932145 | 7/1999 |
| JP | 8-30993 | 2/1996 |
| JP | 9-288837 | 11/1997 |
| JP | 09-288842 | 11/1997 |
| JP | 10-124903 | 5/1998 |
| JP | 2000-132862 | 5/2000 |
| TW | 90110602 | 2/2000 |

OTHER PUBLICATIONS

Malaysian Office Action for Application No. PI20012283; dated Jun. 15, 2006.

* cited by examiner

COMPATIBLE OPTICAL DISK PLAYER AND DATA RECORDING AND REPRODUCING METHOD

CROSS-REFERENCE TO RELATED APPLICATION

This application is based upon and claims priority of Korean Patent Application No. 00-26782 filed May 18, 2000, the contents being incorporated herein by reference.

BACKGROUND OF THE INVENTION

1. Field of the Invention

The present invention relates to a compatible optical disk player and recording and/or reproducing method thereof, and more particularly, to a compatible optical disk player and recording and/or reproducing method using a single optical pickup for recording and/or reproducing data from different types of optical disks.

2. Description of the Related Art

Generally, an optical disk player records and/or reproduces data from an optical disk, such as an un-recordable or recordable compact disk (i.e., CD or CD-R), or a digital video disk (DVD). FIG. 1 is a schematic diagram illustrating a conventional optical pickup system for recording and/or reproducing data from a single optical disk.

As illustrated in FIG. 1, a light beam is emitted from a laser diode 1 and is split into three rays by a diffraction grating 2 used as a tracking servo. After passing through the diffraction grating 2, the beam is transmitted or reflected via a beam splitter 3. The beam splitter 3 has a coated layer 3a formed on a diagonal surface therein by which the beam is semi-transmitted or semi-reflected. The coated layer 3a may include a polarization coating layer on the diagonal surface for transmitting or reflecting the beam according to the type of the light polarization.

The beam splitter 3 transmits the beams from the diffraction grating 2. The three rays are then reflected by the coating layer 3a formed on the diagonal surface, and are concentrated by a collimator lens 4 in the form of a parallel ray. The parallel ray is then focused on the recording surface of the optical disk D via an objective lens 5.

After being focused on the recording surface of the optical disk D, the beam is reflected therefrom and passes through the objective lens 5, the collimator lens 4, and the beam splitter 3, sequentially. An astigmatism lens 7 converges the beam passed through the beam splitter 3 to the photo-detector 8. The photo-detector 8 detects the beam, which is used as a data signal for reproducing and a signal for tracking and focusing control.

However, the conventional optical pickup system described above can be used to record or reproduce data on or from only one type of optical disk. Further, in order to record or reproduce the data, the wavelength of the laser diode must vary depending on the density of the optical disk. Although the general arrangement of the conventional optical pickup system may be used to record or reproduce the data from various types of optical disks, different optical pickups, recording, and reproducing drives are required to record or reproduce the data on or from different optical disks, and thereby the system becomes costly and cumbersome.

For example, the disk drive for the CD or the CD-R needs a laser diode for emitting a laser beam of 780 nm wavelength. In contrast, the disk drive for the DVD, which has higher recording density than the CD or the CD-R, needs a laser diode for emitting a laser beam of 650 nm wavelength. Accordingly, different recording and/or reproducing drives need to be used to record or reproduce the data on or from different types of disks.

Many studies have been conducted to create a compatible recording and/or reproducing drive which can drive CD, CD-R, and DVD disks using a single optical pickup. An example of a compatible optical pickup employs a laser beam source having a single chip in which laser diodes for emitting laser beams of 780 nm and 650 nm wavelengths are built at a close distance to each other in order to reduce the number of components, such as the beam splitter. Specifically, the laser diodes are spaced at a predetermined distance from each other, such as 100–110 m. However, the distance between the laser diodes may create focus and tracking errors when arranging the optical pickup to emit the laser beam of 780 nm wavelength by straying the beam having 650 nm wavelength from an optical axis.

To compensate for these errors, typically a hologram is used to shift the directions of the beams to different places according to the wavelengths of the respective laser beams in a manner such that the beams are received by corresponding photo-detectors. Another embodiment uses a birefringence prism on the front surface of the photo-detector 8 to refract the laser beam for a DVD, which is strayed from the optical axis, to a proper location on the photo-detector 8. These embodiments, however, are costly, due to the additional optical components required such as the birefringence prism and the hologram. Further, because of the increased number of components, the installation of the prism and the hologram becomes complicated.

SUMMARY OF THE INVENTION

The present invention has been made to overcome the above-mentioned problems of the related art, and accordingly, it is an object of the present invention to provide a compatible optical disk player and data recording and/or reproducing method thereof capable of recording and/or reproducing the data on/from various types of optical disks by using a single optical pickup of simple structure by variably setting the light detecting position of a photo-detector according to the types of the optical disks being used.

The above object is accomplished by a compatible optical disk player according to the present invention, including: a first laser diode emitting a first laser beam to a first optical disk; a second laser diode emitting a second laser beam to a second optical disk; a diffraction grating selectively splitting the first and the second laser beams into three rays depending on which optical disk is to be accessed, wherein the three rays include a main ray and two sub-rays; and a photo-detector selectively receiving the three rays of the first laser beam and the three rays of the second laser beam at different detecting portions for the data recording and/or reproduction and error detection and compensation, wherein the detecting portions include a central detecting portion and two peripheral detecting portions.

A further object of the present invention is to provide for a compatible optical disk player including a laser beam source including a first laser diode and a second laser diode, wherein the first laser diode emits a first laser beam of a first wavelength for recording and/or reproducing the data on/from a first optical disk including a first recording density, and the second laser diode emits a second laser beam of a second wavelength for recording and/or reproducing the data on/from a second optical disk including a second recording density; a diffraction grating selectively splitting the first and the second laser beams into a main ray and two sub-rays depending on which optical disk is to be accessed; a beam splitter selectively reflecting the first laser beam toward the first optical disk and the second laser beam toward the second optical disk; an objective lens selectively focusing the first laser beam on a recording surface of the first optical disk and the second laser beam on a recording surface of the second optical disk; and a photo-detector selectively receiving the three rays of the first laser beam and the three rays of the second laser beam at different detecting portions to record and/or reproduce the data and to detect and compensate for errors.

The photo-detector includes a central detecting portion and two peripheral detecting portions. A main ray of the first laser beam arranged on an optical axis is detected from the central detecting portion to record and/or reproduce the data, and a main ray of the second laser beam strayed from the optical axis is detected from one of the peripheral detecting portions to record and/or reproduce the data. The photo-detector is a six-split photo-detector including four cells on the central detecting portion and two cells on the peripheral detecting portion, and receives the main ray of the first laser beam on the four cells of the central detecting portion to determine a focus error and to record and/or reproduce the data on/from the first optical disk, and receives the sub-rays of the first laser beam on the two cells of the peripheral detecting portions to determine a tracking error. The photo-detector further receives the main ray of the second laser beam on one of the two cells of the peripheral detecting portions to record and/or reproduce the data on/from the second optical disk, and receives one of the two sub-rays on the four cells of the central detecting portion to determine a focus error and a tracking error on the second optical disk.

The diffraction grating is selectively disposed between a first position and a second position in the direction of the optical axis, the first position in which the main ray of the first laser beam is incident on the cells of the central detecting portion, while the two sub-rays are incident on the cells of the peripheral detecting portion, and the second position in which the main ray of the second laser beam is incident on one of the cells of the peripheral detecting portion, while one of the two sub-rays is incident on the cells of the central detecting portion. The beam splitter is a polarization beam splitter.

The above and other objects are also accomplished by a method of a compatible optical disk player for recording and/or reproducing the data, according to the present invention, including emitting a first laser beam to a first optical disk; emitting a second laser beam to a second optical disk; selectively splitting the first and the second laser beams into three rays depending on which optical disk is to be accessed, wherein the three rays include a main ray and two sub-rays; and selectively receiving the three rays of the first laser beam and the three rays of the second laser beam at different detecting portions for the data recording and/or reproduction and error detection and compensation, wherein the detecting portions include a central detecting portion and two peripheral detecting portions.

The method of a compatible optical disk player for recording and/or reproducing the data according to the present invention includes selectively emitting a first laser beam of a first wavelength for recording and/or reproducing the data on/from a first optical disk including a first recording density and a second laser beam of a second wavelength for recording and/or reproducing the data on/from a second optical disk including a second recording density; selectively splitting the first and the second laser beams into a main ray and two sub-rays, wherein the main ray is a 0 order light and the sub-rays are ±1 order lights; selectively reflecting the first laser beam toward the first optical disk and the second laser beam toward the second optical disk; selectively focusing the first laser beam on a recording surface of the first optical disk and the second laser beam on a recording surface of the second optical disk; and selectively receiving the three rays of the first laser beam and the three rays of the second laser beam at different detecting portions to record and/or reproduce the data and to detect and compensate for errors. As a result, the data can be recorded or reproduced on/from different types of optical disks by using a single optical pickup.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The above and other objects and advantages of the present invention will become readily apparent by reference to the following detailed description when considered in conjunction with the accompanying drawings wherein.

DETAILED DESCRIPTION OF THE PREFERRED EMBODIMENT

Hereinafter, the preferred embodiment of the present invention will be described in greater detail with reference to the accompanying drawings.

Figure 1:
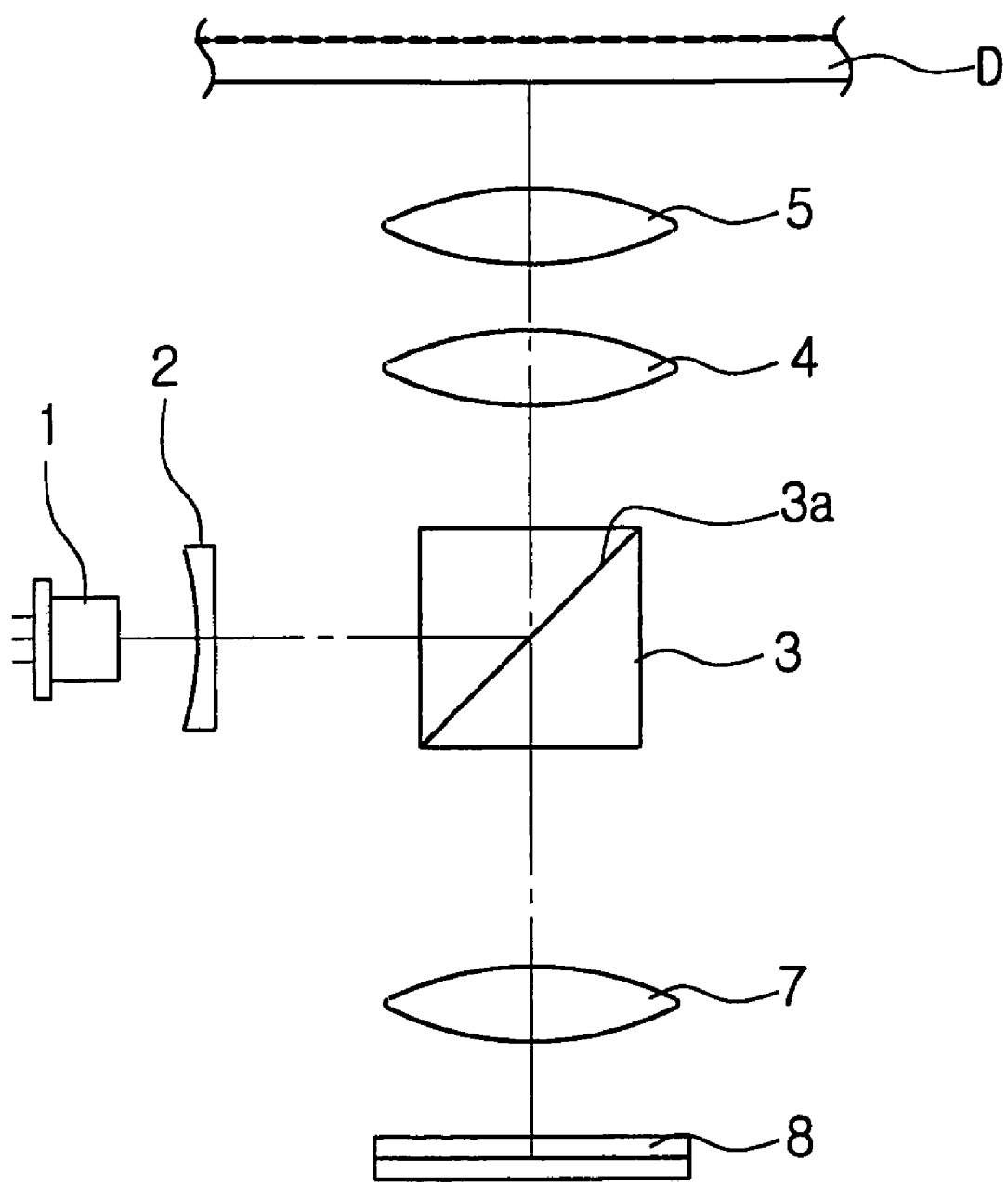
FIG. 1 is a schematic diagram illustrating a conventional optical pickup system for recording and/or reproducing data on or from a single optical disk.
Figure 2:
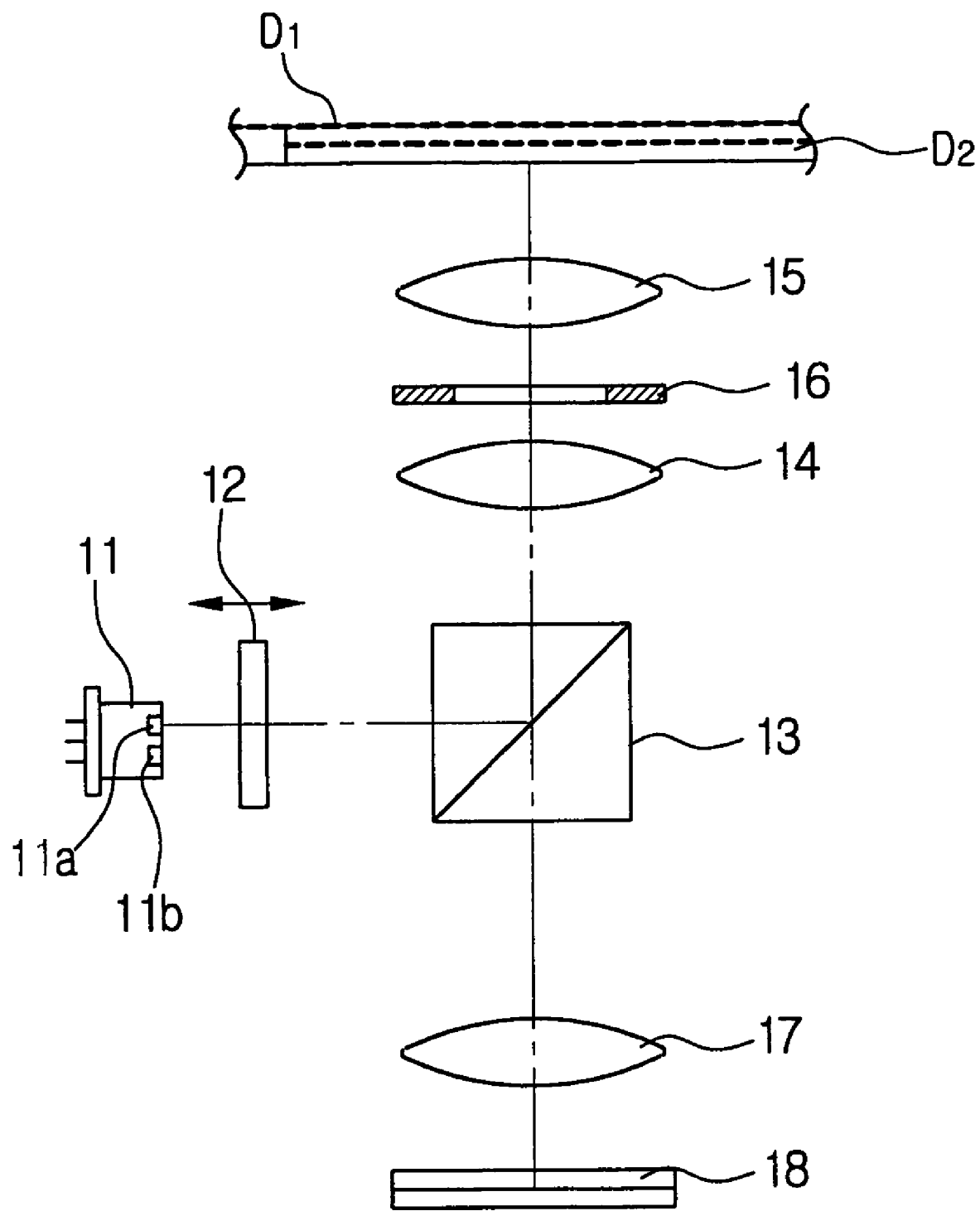
FIG. 2 is a schematic diagram illustrating an optical pickup for recording and/or reproducing the data on or from different types of optical disks, in accordance with an exemplary embodiment of the present invention.

FIG. 2 is a schematic diagram illustrating an optical pickup for recording and/or reproducing data on or from different types of optical disks, in accordance with an exemplary embodiment of the present invention. A laser source 11 includes a first laser diode 11a and a second laser diode 11b emitting a first laser beam and a second laser beam, respectively, of different wavelengths to record and/or reproduce the data on or from optical disks having different recording densities. For example, the first and second laser diodes 11a, 11b may emit Soi P-polarized beams of wavelengths of 780 nm and 650 nm, respectively. Each beam is then used to record and/or reproduce the data on or from a CD-R D1 and DVD D2, respectively. In an exemplary embodiment, the first and second laser diodes 11a, 11b are located on the same optical axis, however, position aberration of 100–110 μm usually occurs when the first and second laser diodes 11a and 11b are installed.

A diffraction grating 12 is located in front of the laser source 11. The diffraction grating 12 selectively splits each of the first and second laser beams emitted from the first and second laser diodes 11a, 11b into three rays including a main ray, i.e., a 0 order light, and two sub-rays, i.e., ±1 order lights. A beam splitter 13 is located on the optical path of the first and second laser beams emitted from the first and second laser diodes 11a, 11b. The beam splitter 13 reflects or transmits an incident laser beam according to the polarization of the three rays.

A collimator lens 14 collimates the three rays from the beam splitter 13 on the optical path of the laser beam of S or P-polarized light. The beam splitter 13, the collimator lens 14, an annular cover lens 16, and an objective lens 15 are coaxially arranged. The objective lens 15 focuses the laser beam on the recording surface of the optical disk. The objective lens 15 has a control section to minimize aberration on the optical disk occurring due to different thicknesses of the CD-R D1 and DVD D2.

The annular cover lens 16 adjusts the size of the converged laser beam focused on the optical disk because the recording densities of the CD-R D1 and the DVD D2 are different. After being focused on and reflected from the optical disk D1 or D2, the laser beam is reflected and passed through the objective lens 15, the annular cover lens 16, the collimator lens 14, and the beam splitter 13, and is incident on a convergent lens 17, which is located on the optical path of the reflected beam. A 6-split photo-detector 18 receives the convergent beam from the convergent lens 17.

Figure 3:
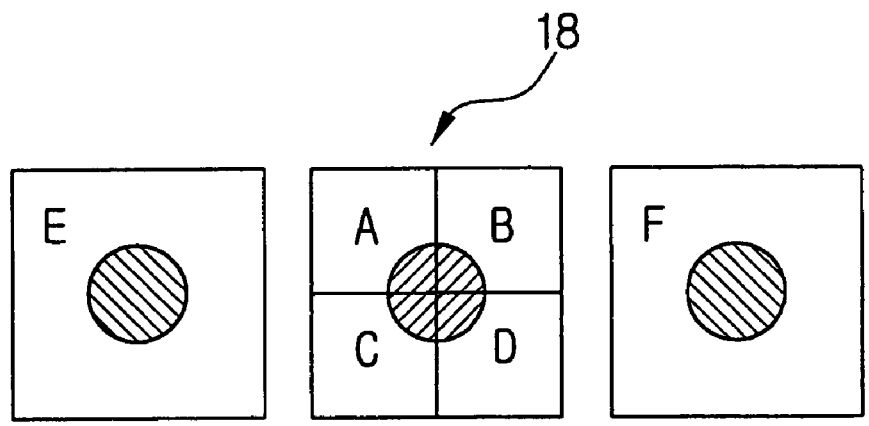
FIG. 3 is a schematic diagram illustrating a photo-detector receiving light when the optical pickup illustrated in FIG. 2 reproduces the data from a CD-R.
Figure 4:
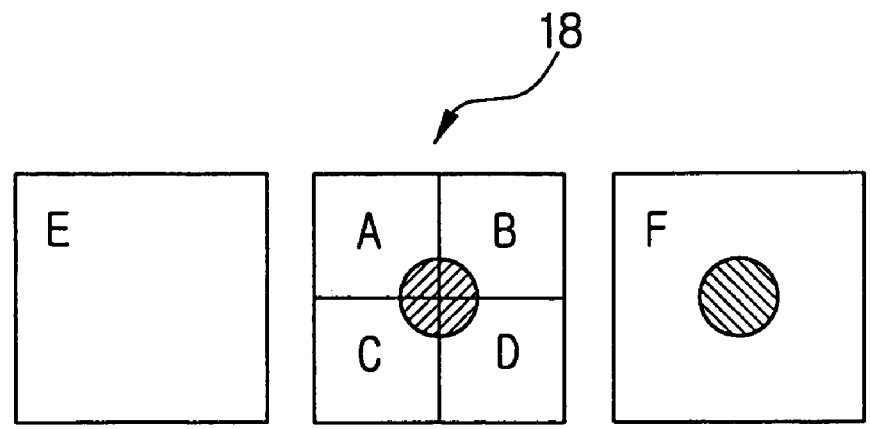
FIG. 4 is a schematic diagram illustrating the photo-detector receiving the light when the optical pickup illustrated in FIG. 2 reproduces the data from a DVD.

FIG. 3 is a schematic diagram illustrating the photo-detector 18 including a central detecting portion, including cells A, B, C, and D and a peripheral detecting portion including cells E and F, receiving light when the optical pickup illustrated in FIG. 2 reproduces the data from the CD-R D1. FIG. 4 is a schematic diagram illustrating the photo-detector 18 including a central detecting portion, including cells A, B, C, and D and a peripheral detecting portion including cells E and F, receiving light when the optical pickup illustrated in FIG. 2 reproduces the data from the DVD D2. Among the beams reflected on the optical disks D1 and D2, the main ray from the first laser diode 11a, i.e., 0 order light, is incident on the cells A, B, C, and D of the central detecting portion, while the two sub-rays, i.e., ±1 order lights, are incident on the cells E and F of the peripheral detecting portion.

Because the first laser diode 11a and the second laser diode 11b have a distance of 100–110 µm in between, the second laser beam of the second laser diode 11b reflected on the optical disk D1 or D2 is slightly strayed from the optical axis. Accordingly, the main ray from the second laser diode 11b, i.e., the 0 order light, is incident on one of the cells E and F of the peripheral detecting portion, while one of the other two sub-rays, i.e., ±1 order lights, is incident on the cells A, B, C, and D of the central detecting portion.

The diffraction grating 12 is selectively movable on the optical axis. Accordingly, in a case that the 0 order light and ±1 order lights of the first laser beam from the first laser diode 11a are incident on the photo-detector 18, moving the diffracting grating 12 along the optical axis allows the 0 order light and ±1 order lights of the second laser beam from the second laser diode 11b to be incident on the proper location of the photo-detector 18.

Thus, in the event that the 0 order light and ±1 order lights of the first laser beam of the first laser diode 11a are set to be incident on the central portions A, B, C, and D and the peripheral portions E and F, respectively, on the photo detector 18 to use the CD-R D1, the DVD D2 may be used by moving the diffraction grating 12 along of the optical axis between a first position and a second position and setting the 0 order light of the second laser beam of the second laser diode 11b to be incident on one of the cells E and F of the peripheral detecting portion, and one of the ±1 order lights to be incident on the cells A, B, C, and D of the central detecting portion while abandoning the other ±1 order light.

The method of recording and/or reproducing the data with the compatible optical disk player having an optical pickup constructed as described above will be described in greater detail with reference to FIGS. 2 to 4. When recording and/or reproducing the data on or from the CD-R D1, the first laser beam having a wavelength of 780 nm is emitted from the first laser diode 11a. The beam includes S and P-polarized lights. In an exemplary embodiment, the first and second laser diodes 11a, 11b are arranged on the same optical axis. However, because it is practically impossible to install the first and second laser diodes 11a, 11b at the same location, the second laser diode 11b is 100–110 m apart from the first laser diode 11a.

The first laser beam is split into three rays, i.e., into 0 order light and ±1 order lights by the diffraction grating 12. The first laser beam of the S or P-polarized beam is then reflected from the beam splitter 13 toward CD-R D1 at an angle of 90 degree, and is passed through the collimator lens 14, the annular cover lens 16, and the objective lens 15.

After being reflected toward the CD-R D1, the first laser beam is transmitted back through the objective lens 15, the annular cover lens 16, the collimator lens 14, and the beam splitter 13, which are coaxially disposed with respect to the optical axis. The laser beam is then converged by the convergent lens 17 and received by the photo-detector 18.

As illustrated in FIG. 3, the photo-detector 18 is a six-split photo-detector having four cells A, B, C, and D of the central detecting portion and two cells E and F of the peripheral portion. From the beam reflected from the CD-R D1, the main ray, i.e., 0 order light, of the three rays from the first laser diode 11 is incident on the cells A, B, C, and D of the central detecting portion, while the other two rays, i.e., ±1 order lights, are incident on the cells E and F of the peripheral detecting portion, respectively.

A reproduction "RF" signal, a focus error, and a tracking error are detected by using the first laser beam received by the photo-detector 18. Specifically, the focus error is detected by a focusing servo (not shown) using the 0 order light converged on the cells A, B, C, and D of the central detecting portion of the photo-detector 18 using the following equation:

$$\text{FES (Focus Error Signal)} = (A+C)-(B+D) \tag{1}$$

The tracking error is detected by a tracking servo (not shown) using ±1 order lights converged on the cells E and F of the peripheral detecting portion of the photo-detector 18 using the following equation:

$$\text{TES (Tracking Error Signal)} = E-F \tag{2}$$

The reproduction "RF" signal is detected by using 0 order light using the following equation:

$$\text{RFS (RF Signal)} = A+B+C+D \tag{3}$$

Further, when recording and/or reproducing the data on or from the DVD D2, the second laser beam having a wavelength of 650 nm is emitted from the second laser diode 11b. In an exemplary embodiment the second laser beam has an S-polarized light. The second laser diode 11b is initially 100~110 m apart from the first laser diode 11a. The second laser beam emitted from the second laser diode 11b is split into three rays, i.e., into 0 order light and ±1 order lights, by the diffraction grating 12. The second laser beam having the S or P-polarized beam emitted from the second laser diode 11b is reflected toward the DVD D2 at an angle of 90° as it passes through the beam splitter 13. After being reflected from the DVD D2, the laser beam is transmitted back in the direction of the optical axis and is converged by the convergent lens 17 and received by the photo-detector 18.

The second laser beam received by the photo-detector 18 has an optical axis different from the optical axis of the first laser beam due to the distance between the first laser diode 11a and the second laser diode 11b. Accordingly, as shown in FIG. 4, the main ray, i.e., 0 order light, of the second laser beam reflected from the DVD D2 is incident on one of the cells E and F of the peripheral detecting portion. Also, among the two sub-rays, i.e. ±1 order lights, one first order light is strayed from the cells E and F of the peripheral portion, while the other first order light is incident on the cells A, B, C, and D of the central detecting portion. Here, the positions of the first and second laser diodes 11a and 11b, with respect to each other, are different depending on the particular type of device being used. Thus, an adjustment error is performed according to the initial positions of both the first and second laser diodes 11a and 11b. Because the diffraction grating 12 may be moved along the direction of the optical axis, the diffraction grating 12 may be adjusted so that the 0 order light and the ±1 order lights may be incident on the proper location on the photo-detector 18.

A method for detecting the reproduction "RF" signal, a focus error, and a tracking error while using the DVD disk D2 with the second laser beam received on the photo-detector 18 is described hereinafter. The focus error is detected by the focusing servo using the 1 order lights converged on the cells A, B, C, and D of the central detecting portion of the photo-detector 18 using the following equation:

$$FES\ (Focus\ Error\ Signal)=(A+D)-(B+C) \quad (4)$$

The tracking error is detected by the tracking servo using one of the ±1 order lights converged on the cells A, B, C, and D of the photo-detector 18 using the following equation:

$$TES\ (Tracking\ Error\ Signal)=(A+C)-(B+D) \quad (5)$$

The replay "RF" signal is detected by using the 0 order light converged on one of the cells E and F of the peripheral portion using the following equation:

$$RFS\ (RF\ Signal)=E,\ or\ RFS=F \quad (6)$$

As described above, by detecting the respective signal while positioning the light detecting position on the photo-detector 18 depending on the type of disk being used, and by considering the positional difference between the laser diode for CD-R D1 and DVD D2, a single optical pickup can record and/or reproduce the data on or from the various types of the disks, such as CD-R D1 and DVD D2.

The present invention has been developed to overcome the above-mentioned problems of current recording and/or reproducing drives. The present invention provides a compatible optical disk player and the data recording and/or reproducing method capable of recording and/or reproducing the data on or from different types of optical disks D1 and D2 with a single optical pickup by variably setting the light detecting position on the photo-detector 18 according to the type of disk D1, D2 being used.

More specifically, among the beams reflected from the optical disks D1 and D2, the main ray of the first laser beam emitted from the first laser source is incident on the cells A, B, C, and D of the central detecting portion of the photo-detector 18, while the two sub-rays are incident on the cells E and F of the peripheral detecting portion of the photo detector 18. Further, the respective optical elements are adjusted so that the main ray of the second laser beam, which is emitted from the second laser source positioned at a slight distance from the first laser source, can be incident on one of the cells E and F of the peripheral detecting portion of the photo-detector 18, while one of the two sub-rays are incident on the cells A, B, C, and D of the central detecting portion. When an electric signal is generated from the photo-detector 18, the main ray of the first laser beam on the cells A, B, C, and D of the central detecting portion is processed by the focusing servo to determine a focus error signal and also to record and/or reproduce the data. The sub-rays of the first laser beam on the cells E and F of the peripheral detecting portion are used by the tracking servo to determine the tracking error signal. Further, the main ray of the second laser beam on one of the cells E and F of the peripheral detecting portion is used to record and/or reproduce the data. One of the two sub-rays of the second laser beam on the cells A, B, C, and D is processed by the focusing servo and the tracking servo. An error (100~110 m) occurs due to the distances between initial setting positions of the first and second laser beam sources. Such an error can be compensated by moving the diffraction grating 12 forward or backward.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. An apparatus for recording and/or reproducing data on and/or from various types of optical disks, comprising:
   a first laser diode emitting a first laser beam;
   a second laser diode emitting a second laser beam;
   a diffraction grating splitting the first and the second laser beams into a main ray and sub rays according to movement of the diffraction grating between a first position and a second position along an optical axis; and
   a photo-detector having a central portion and at least one peripheral portion, the central portion receiving the main ray of the first laser beam based on the first position of the diffraction grating and at least one of the peripheral portions receiving the main ray of the second laser beam based on the second position of the diffraction grating, wherein the first and the second laser diodes are formed in one package.

2. The apparatus as recited in claim 1, wherein the photo-detector is a single unit on which both the first and the second detecting portions are formed.

3. A compatible disk player, comprising:
   a first laser diode emitting a first laser beam to a first optical disk;
   a second laser diode emitting a second laser beam to a second optical disk;
   a single diffraction grating selectively splitting the first and the second laser beams into three rays depending on which optical disk is to be accessed, wherein the three rays comprise a main ray and two sub-rays; and
   a photo-detector selectively receiving the three rays of the first laser beam and the three rays of the second laser beam at different detecting portions for data recording and/or reproduction and error detection and compensation, wherein the detecting portions comprise a central detecting portion and two peripheral detecting portions, the central detecting portion receiving the main ray of the first laser beam when the first optical disk is to be accessed and at least one of the peripheral detecting portions receiving the main ray of the second laser beam when the second optical disk is to be accessed.

4. The compatible disk player as recited in claim 3, wherein the photo-detector receives the main ray of the first laser beam on the central detecting portion to determine a focus error and to record and/or reproduce the data on/from the first optical disk, and receives the sub-rays of the first laser beam on the peripheral detecting portions to determine a tracking error.

5. A compatible disk player, comprising:
a first laser diode emitting a first laser beam to a first optical disk;
a second laser diode emitting a second laser beam to a second optical disk;
a diffraction grating selectively splitting the first and the second laser beams into three rays depending on which optical disk is to be accessed, wherein the three rays comprise a main ray and two sub-rays; and
a photo-detector selectively receiving the three rays of the first laser beam and the three rays of the second laser beam at different detecting portions for data recording and/or reproduction and error detection and compensation,
wherein the detecting portions comprise a central detecting portion and two peripheral detecting portions, and
wherein the photo-detector receives the main ray of the second laser beam on one of the peripheral detecting portions to record and/or reproduce the data on/from the second optical disk, and receives one of the two sub-rays on the central detecting portion to determine a focus error and a tracking error on the second optical disk, wherein the central detecting portion comprises cells A, B, C, and D, and the peripheral detecting portions comprise cells E and F.

6. The compatible disk player as recited in claim 5, wherein the error detection and compensation comprises determining the focus error of the first laser beam using:

Focus error=$(A+D)-(B+C)$.

7. The compatible disk player as recited in claim 5, wherein the error detection and compensation comprises determining the tracking error of the first laser beam using:

Tracking error=$E-F$.

8. The compatible disk player as recited in claim 5, wherein the data recording and/or reproduction of the first laser beam comprises determining a signal for recording and/or reproducing the data using:

recording and/or reproducing data=$A+B+C+D$.

9. The compatible disk player as recited in claim 5, wherein the error detection and compensation comprises determining the focus error of the second laser beam using:

Focus error=$(A+D)-(B+C)$.

10. The compatible disk player as recited in claim 5, wherein the error detection and compensation comprises determining the tracking error of the second laser beam using:

Tracking error=$(A+C)-(B+D)$.

11. The compatible disk player as recited in claim 5, wherein the data recording and/or reproduction of the second laser beam comprises determining a signal for recording and/or reproducing the data using:

recording and/or reproducing data=$E$ or $F$.

12. A compatible disk player, comprising:
a first laser diode emitting a first laser beam to a first optical disk;
a second laser diode emitting a second laser beam to a second optical disk;
a diffraction grating selectively splitting the first and the second laser beams into three rays depending on which optical disk is to be accessed, wherein the three rays comprise a main ray and two sub-rays; and
a photo-detector selectively receiving the three rays of the first laser beam and the three rays of the second laser beam at different detecting portions for data recording and/or reproduction and error detection and compensation,
wherein the detecting portions comprise a central detecting portion and two peripheral detecting portions, and
wherein an error occurring due to initial positions of the first laser diode and the second laser diode is compensated for by selectively moving the diffraction grating between a first position and a second position,
the first position being such that the main ray of the first laser beam is incident on the central detecting portion, while the two sub-rays are incident on the peripheral detecting portion, and
the second position being such that the main ray of the second laser beam is incident on one of the peripheral detecting portions, while one of the two sub-rays is incident on the central detecting portion.

13. A compatible optical disk player, comprising:
a laser beam source comprising a first laser diode and a second laser diode, wherein the first laser diode emits a first laser beam of a first wavelength recording and/or reproducing data on/from a first optical disk comprising a first recording density, and the second laser diode emits a second laser beam of a second wavelength recording and/or reproducing the data on/from a second optical disk comprising a second recording density;
a single diffraction grating selectively splitting the first and the second laser beams into a main ray and two sub-rays depending on which optical disk is to be accessed;
a beam splitter selectively reflecting the first laser beam toward the first optical disk and the second laser beam toward the second optical disk;
an objective lens selectively focusing the first laser beam on a recording surface of the first optical disk and the second laser beam on a recording surface of the second optical disk; and
a photo-detector selectively receiving the three rays of the first laser beam and the three rays of the second laser beam at different detecting portions to record and/or reproduce the data and to detect and compensate errors, wherein the photo-detector is a six-split photo-detector comprising four cells on a central detecting portion and two cells on peripheral detecting portions, the central detecting portion receiving the main ray of the first laser beam when the first optical disk is to be accessed and at least one of the peripheral detecting portions receiving the main ray of the second laser beam when the second optical disk is to be accessed.

14. The compatible optical disk player as claimed in claim 13, wherein the main ray of the first laser beam arranged on an optical axis is detected from the central detecting portion to record and/or reproduce the data on/from the first optical disk, and the main ray of the second laser beam strayed from the optical axis is detected from one of the peripheral detecting portions to record and/or reproduce the data on/from the second optical disk.

15. A compatible optical disk player, comprising:

a laser beam source comprising a first laser diode and a second laser diode, wherein the first laser diode emits a first laser beam of a first wavelength file recording and/or reproducing data on/from a first optical disk comprising a first recording density, and the second laser diode emits a second laser beam of a second wavelength recording and/or reproducing the data on/from a second optical disk comprising a second recording density;

a diffraction grating selectively splitting the first and the second laser beams into a main ray and two sub-rays depending on which optical disk is to be accessed;

a beam splitter selectively reflecting the first laser beam toward the first optical disk and the second laser beam toward the second optical disk;

an objective lens selectively focusing the first laser beam on a recording surface of the first optical disk and the second laser beam on a recording surface of the second optical disk; and a photo-detector selectively receiving the three rays of the first laser beam and the three rays of the second laser beam at different detecting portions to record and/or reproduce the data and to detect and compensate errors, wherein the photo-detector is a six-split photo-detector comprising four cells on a central detecting portion and two cells on peripheral detecting portions, wherein the main ray of the first laser beam arranged on an optical axis is detected from the central detecting portion to record and/or reproduce the data on/from the first optical disk, and the main ray of the second laser beam strayed from the optical axis is detected from one of the peripheral detecting portions to record and/or reproduce the data on/from the second optical disk, wherein the photo-detector receives the main ray of the first laser beam on the four cells of the central detecting portion to determine a focus error and to record and/or reproduce the data on/from the first optical disk, and receives the sub-rays of the first laser beam on the two cells of the peripheral detecting portions, respectively, to determine a tracking error, and receives the main ray of the second laser beam on one of the two cells of the peripheral detecting portions to record and/or reproduce the data on/from the second optical disk, and receives one of the two sub-rays on the four cells of the central detecting portion to determine a focus error and a tracking error on the second optical disk.

16. The compatible optical disk player as claimed in claim 15, wherein the diffraction grating is selectively disposed between a first position and a second position in the direction of the optical axis, the first position being such that the main ray of the first laser beam is incident on the cells of the central detecting portion, while the two sub-rays are incident on the cells of the peripheral detecting portion, and the second position being such that the main ray of the second laser beam is incident on one of the cells of the peripheral detecting portion, while one of the two sub-rays is incident on the cells of the central detecting portion.

17. A compatible disk player, comprising:

a laser beam source comprising a first laser diode and a second laser diode, wherein the first laser diode emits a first laser beam of a first wavelength recording and/or reproducing data on/from a first optical disk comprising a first recording density, and the second laser diode emits a second laser beam of a second wavelength recording and/or reproducing the data on/from a second optical disk comprising a second recording density;

a diffraction grating selectively splitting the first and the second laser beams into a main ray and two sub-rays depending on which optical disk is to be accessed, wherein the diffraction grating is movable between a first position and a second position in the direction of the optical axis based upon which optical disk is to be accessed;

a beam splitter selectively reflecting the first laser beam toward the first optical disk and the second laser beam toward the second optical disk;

an annular cover lens selectively adjusting a size of the first laser beam on the first optical disk and the second laser beam on the second optical disk;

an objective lens selectively focusing the first laser beam on a recording surface of the first optical disk and the second laser beam on a recording surface of the second optical disk; and a photo-detector comprising a central detecting portion and two peripheral detecting portions, wherein the photo-detector selectively receives the main ray of the first laser beam on the central detecting portion to determine a focus error and to record and/or reproduce the data on/from the first optical disk and receives the sub-rays of the first laser beam on the peripheral detecting portions to determine a tracking error, and the main ray of the second laser beam on the peripheral detecting portions to record and/or reproduce the data on/from the second optical disk and receives one of the two sub-rays on the central detecting portion to determine the focus error and the tracking error on the second optical disk.

18. A method for a compatible optical disk player for recording and/or reproducing data, comprising:

emitting a first laser beam to a first optical disk;

emitting a second laser beam to a second optical disk;

selectively splitting the first and the second laser beams into three rays depending on which optical disk is to be accessed with a single diffraction grating, wherein the three rays comprise a main ray and two sub-rays depending on which optical disk to be accessed; and selectively receiving the three rays of the first laser beam and the three rays of the second laser beam at different detecting portions of for the data recording and/or reproducing and error detection and compensation, wherein the detecting portions comprise a central detecting portion and two peripheral detecting portions, the central detecting portion receiving the main ray of the first laser beam when the first optical disk is to be accessed and at least one of the peripheral detecting portions receiving the main ray of the second laser beam when the second optical disk is to be accessed.

19. The method as recited in claim 18, further comprising:
receiving the main ray of the first laser beam on the central detecting portion to determine a focus error and to record and/or reproduce the data on/from the first optical disk; and
receiving the sub-rays of the first laser beam on the peripheral detecting portions to determine a tracking error.

20. A method for a compatible optical disk player for recording and/or reproducing data comprising:
emitting a first laser beam to a first optical disk;
emitting a second laser beam to a second optical disk;
selectively splitting the first and the second laser beams into three rays depending on which optical disk is to be accessed, wherein the three rays comprise a main ray and two sub-rays depending on which optical disk to be accessed;
selectively receiving the three rays of the first laser beam and the three rays of the second laser beam at different detecting portions for the data recording and/or reproducing and error detection and compensation, wherein the detecting portions comprise a central detecting portion and two peripheral detecting portions;
receiving the main ray of the first laser beam on the central detecting portion to determine a focus error and to record and/or reproduce the data on/from the first optical disk;
receiving the sub-rays of the first laser beam on the peripheral detecting portions to determine a tracking error;
receiving the main ray of the second laser beam on one of the peripheral detecting portions to record and/or reproduce the data on/from the second optical disk; and
receiving one of the two sub-rays on the central detecting portion to determine a focus error and a tracking error on the second optical disk, wherein the central detecting portion comprises cells A, B, C, and D, and the peripheral detecting portions comprise cells E and F.

21. The method as recited in claim 20, further comprising determining the focus error of the first laser beam using:

Focus error=$(A+D)-(B+C)$.

22. The method as recited in claim 20, further comprising determining the tracking error of the first laser beam using:

Tracking error=$E-F$.

23. The method as recited in claim 20, further comprising determining the data recording and/or reproducing of the first laser beam using:

recording and/or reproducing data=$A+B+C+D$.

24. The method as recited in claim 20, further comprising determining the focus error of the second laser beam using:

Focus error=$(A+D)-(B+C)$.

25. The method as recited in claim 20, further comprising determining the tracking error of the second laser beam using:

Tracking error=$(A+C)-(B+D)$.

26. The method as recited in claim 20, further comprising determining the data recording and/or reproducing of the second laser beam using:

recording and/or reproducing data=$E$ or $F$.

27. The method for a compatible optical disk player for recording and/or reproducing data, comprising:
emitting a first laser beam to a first optical disk;
emitting a second laser beam to a second optical disk;
selectively splitting the first and the second laser beams into three rays depending on which optical disk is to be accessed with a single diffraction grating, wherein the three rays comprise a main ray and two sub-rays depending on which optical disk to be accessed;
selectively receiving the three rays of the first laser beam and the three rays of the second laser beam at different detecting portions for the data recording and/or reproducing and error detection and compensation, wherein the detecting portions comprise a central detecting portion and two peripheral detecting portions;
compensating for an error occurring due to initial positions of the first laser diode and the second laser diode by moving the diffraction grating between a first position and a second position, the first position in which the main ray of the first laser beam is incident on the central detecting portion, while the two sub-rays are incident on the peripheral detecting portions, respectively, and the second position in which the main ray of the second laser beam is incident on one of the peripheral detecting portion, while one of the two sub-rays is incident on the central detecting portion.

28. A method for a compatible optical disk player for recording and/or reproducing data, comprising:
selectively emitting a first laser beam of a first wavelength recording and/or reproducing the data on/from a first optical disk comprising a first recording density and a second laser beam of a second wavelength recording and/or reproducing the data on/from a second optical disk comprising a second recording density;
selectively splitting the first and the second laser beams with a single diffraction grating into a main ray and two sub-rays depending on which optical disk is to be accessed, wherein the main ray is a zero order light and the sub-rays are first order lights;
selectively reflecting the first laser beam toward the first optical disk and the second laser beam toward the second optical disk;
selectively focusing the first laser beam on a recording surface of the first optical disk and the second laser beam on a recording surface of the second optical disk; and
selectively receiving the three rays of the first laser beam and the three rays of the second laser beam at different detecting portions to record and/or reproduce the data and to detect and compensate errors, wherein the detecting portions comprise a central detecting portion and two peripheral detecting portions, the central detecting portion receiving the main ray of the first laser beam when the first optical disk is to be accessed and at least one of the peripheral detecting portions receiving the main ray of the second laser beam when the second optical disk is to be accessed.

29. A method for a compatible optical disk player for recording and/or reproducing data, comprising:
selectively emitting a first laser beam of a first wavelength recording and/or reproducing the data on/from a first optical disk comprising a first recording density and a second laser beam of a second wavelength recording and/or reproducing the data on/from a second optical disk comprising a second recording density;
selectively splitting the first and the second laser beams with a single diffraction grating into a main ray and two sub-rays depending on which optical disk is to be accessed, wherein the main ray is a zero order light and the sub-rays are first order lights;

selectively reflecting the first laser beam toward the first optical disk and the second laser beam toward the second optical disk;

selectively focusing the first laser beam on a recording surface of the first optical disk and the second laser beam on a recording surface of the second optical disk;

selectively receiving the three rays of the first laser beam and the three rays of the second laser beam at different detecting portions to record and/or reproduce the data and to detect and compensate errors;

detecting the main ray of the first laser beam arranged on an optical axis from a central detecting portion of a photo-detector to record and/or reproduce the data on/from the first optical disk; and detecting the main ray of the second laser beam strayed from the optical axis from one of peripheral detecting portions of the photo-detector to record and/or reproduce the data on/from the second optical disk.

30. A method for a compatible optical disk player for recording and/or reproducing data, comprising:

selectively emitting a first laser beam of a first wavelength recording and/or reproducing the data on/from a first optical disk comprising a first recording density and a second laser beam of a second wavelength recording and/or reproducing the data on/from a second optical disk comprising a second recording density;

selectively splitting the first and the second laser beams into a main ray and two sub-rays depending on which optical disk is to be accessed, wherein the main ray is a zero order light and the sub-rays are first order lights;

selectively reflecting the first laser beam toward the first optical disk and the second laser beam toward the second optical disk;

selectively focusing the first laser beam on a recording surface of the first optical disk and the second laser beam on a recording surface of the second optical disk;

selectively receiving the three rays of the first laser beam and the three rays of the second laser beam at different detecting portions to record and/or reproduce the data and to detect and compensate errors;

detecting the main ray of the first laser beam arranged on an optical axis from a central detecting portion of a photo-detector to record and/or reproduce the data on/from the first optical disk;

detecting the main ray of the second laser beam strayed from the optical axis from one of peripheral detecting portions of the photo-detector to record and/or reproduce the data on/from the second optical disk.;

receiving the main ray of the first laser beam on four cells of the central detecting portion to determine a focus error and to record and/or reproduce the data on/from the first optical disk;

receiving the sub-rays of the first laser beam on two cells of the peripheral detecting portions, respectively, to determine a tracking error;

receiving the main ray of the second laser beam on one of the two cells of the peripheral detecting portions to record and/or reproduce the data on/from the second optical disk; and receiving one of the two sub-rays of the second laser beam on the four cells of the central detecting portion to determine a focus error and a tracking error on the second optical disk.

31. The method as claimed in claim 30, further comprising:

selectively disposing the diffraction grating between a first position and a second position in the direction of the optical axis, the first position in which the main ray of the first laser beam is incident on the cells of the central detecting portion, while the two sub-rays of the first laser beam are incident on the cells of the peripheral detecting portions, and the second position in which the main ray of the second laser beam is incident on one of the cells of the peripheral detecting portions, while one of the two sub-rays of the second laser beam is incident on the cells of the central detecting portion.

32. A method for a compatible optical disk player for recording and/or reproducing data, comprising:

selectively emitting a first laser beam of a first wavelength recording and/or reproducing the data on/from a first optical disk comprising a first recording density, and a second laser beam of a second wavelength recording and/or reproducing the data on/from a second optical disk comprising a second recording density;

selectively splitting the first and the second laser beams into a main ray and two sub-rays, wherein the diffraction grating is movable between a first position and a second position in the direction of the optical axis based upon which optical disk is to be accessed;

selectively reflecting the first laser beam toward the first optical disk and the second laser beam toward the second optical disk;

selectively adjusting a size of the first laser beam on the first optical disk and the second laser beam on the second optical disk;

selectively focusing the first laser beam on a recording surface of the first optical disk and the second laser beam on a recording surface of the second optical disk;

receiving the main ray of the first laser beam on a central detecting portion to determine a focus error and to record and/or reproduce the data on/from the first optical disk;

receiving the sub-rays of the first laser beam on peripheral detecting portions to determine a tracking error;

receiving the main ray of the second laser beam on one of the peripheral detecting portions to record and/or reproduce the data on/from the second optical disk; and receiving one of the two sub-rays on the central detecting portion to determine the focus error and the tracking error on the second optical disk.

* * * * *

UNITED STATES PATENT AND TRADEMARK OFFICE
CERTIFICATE OF CORRECTION

PATENT NO. : 7,230,904 B2
APPLICATION NO. : 09/852002
DATED : June 12, 2007
INVENTOR(S) : Soo han Park It is certified that error appears in the above-identified patent and that said Letters Patent is hereby corrected as shown below:

Front Page, Column 2 (Abstract), change

"A simulation device for simulating an operation of a system constituted by a plurality of machines. An operation program is executed by an arithmetic processing unit in a controller of a machine or by an information processing device having a function of analyzing the operation program equivalent to the controller of the machine, to obtain operation command data for the machine. The obtained operation command data of the machine with lapsing time information are received by the simulation device and stored as historical data. Operation programs of all of the machines constituting the system are executed to obtain historical data of operations of the machines, which are united by arranging the data in time series from a start of simultaneous operations of the machines based on the lapsing time information. Images of three-dimensional models of the machines are displayed by animation based on the united historical data."

to

--A compatible optical disk player and data recording and/or reproducing method includes a laser beam source including a first laser diode and a second laser diode, where the first laser diode emits a first laser beam of a first wavelength for recording and/or reproducing the data on/from a first optical disk including a first recording density, and the second laser diode emits a second laser beam of a second wavelength for recording and/or reproducing the data on/from a second optical disk including a second recording density. A diffraction grating selectively splits the first and the second laser beams into a main ray and two sub-rays depending on which optical disk is to be accessed. A photo-detector selectively receives the three rays of the first laser beam and the three rays of the second laser beam at different detecting portions for the data recording and/or reproducing and error detection and compensation.--.

UNITED STATES PATENT AND TRADEMARK OFFICE
CERTIFICATE OF CORRECTION

PATENT NO. : 7,230,904 B2
APPLICATION NO. : 09/852002
DATED : June 12, 2007
INVENTOR(S) : Soo han Park It is certified that error appears in the above-identified patent and that said Letters Patent is hereby corrected as shown below:

Column 8, Line 38, change "sub rays" to --sub-rays--.

Column 11, Line 11, before "recording" delete "file".

Column 12, Line 59, after "portions" delete "of".

Column 14, Line 15, after "portions;" insert --and--.

Column 15, Line 51, change "disk.;" to --disk;--.

Signed and Sealed this

Twenty-second Day of December, 2009

David J. Kappos
*Director of the United States Patent and Trademark Office*